Figure 1:
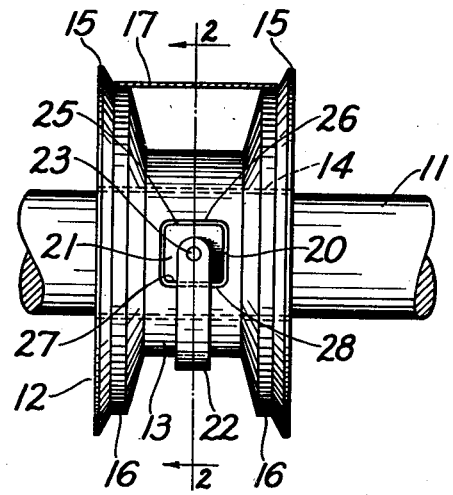

May 7, 1940.  E. W. JENSEN ET AL  2,199,999

FRICTION CLUTCH

Filed Nov. 19, 1938

Einar W. Jensen
Charles E. Ives
INVENTORS

BY Newton M. Perris
J. Griffin Little
ATTORNEYS

Patented May 7, 1940

2,199,999

UNITED STATES PATENT OFFICE 2,199,999

FRICTION CLUTCH

Einar W. Jensen and Charles E. Ives, Rochester, N. Y., assignors to Eastman Kodak Company, Rochester, N. Y., a corporation of New Jersey Application November 19, 1938, Serial No. 241,435

2 Claims. (Cl. 64—30)

The present invention relates to friction clutches, and has as one of its objects the provision of a clutch of this type which will transmit rotary motion from the driving member to the driven member, yet which will enable the driven member to slip when the load thereon reaches a predetermined maximum.

A further object of the invention is the provision of a friction clutch which is simple in construction, comprises few parts of rugged construction, is simple to assemble, inexpensive to manufacture, and highly effective in use.

To these and other ends, the invention resides in certain improvements and combinations of parts all as will be hereinafter more fully described, the novel features being pointed out in the claims at the end of the specification.

Figure 2:
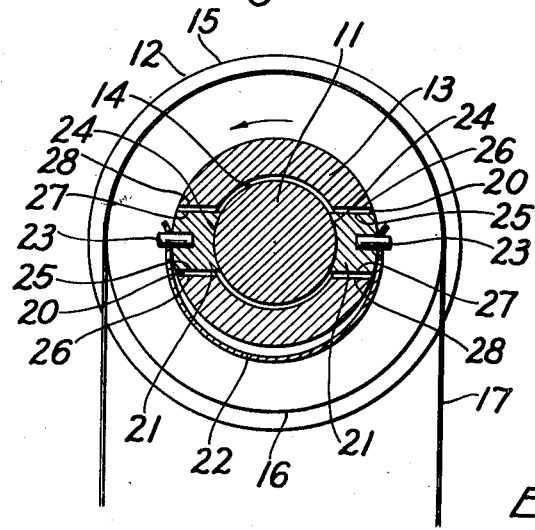

In the drawing:

Fig. 1 is a front elevation view of a driven roller and the drive shaft therefor, showing the relation thereto of a friction clutch member which operatively connects the driving member to the driven member, and Fig. 2 is a vertical sectional view taken substantially on the line 2—2 of Fig. 1, showing the arrangement by which the friction members connect the driving and driven members, and a spring for yieldably holding the friction members in engagement with the driving members.

Similar reference numerals throughout the various views indicate the same parts.

The present invention is embodied in the present instance, by way of illustration, in a driving roller which is primarily designed for use in a film developing machine which operates on the friction drive principle. In such machines, it is necessary that the film rollers on the various driving shafts have sufficient driving tendency to not only overcome the resistance of the film movement, but to also propel the film strip through the machine. While the present embodiment relates to a film developing or processing machine, it is apparent that the disclosed structure is adapted to a wide variety of uses. The applicant is therefore not to be limited to the specific structure and use shown except in so far as is necessitated by the prior art and the scope of the appended claims.

In certain types of machines for developing or processing continuous strips of photographic film, the film strip is arranged in helical loops over a series of rollers, some of which are mounted on a drive shaft while others are loosely and freely mounted on what is known as a stationary or idler shaft. The rollers of the drive shaft are operatively connected to and driven by the drive shaft so as to continually move or propel the film strip through the machine or apparatus. The various rollers are held against axial movement along the shaft by the adjacent rollers, or by any other suitable means well known to those in the art.

Fig. 1 shows a drive shaft 11 of a film processing machine adapted to support and drive a series of film propelling rollers. As these rollers are all identical in structure only one will be shown and described. Each roller 12 comprises a hub 13 formed with a central axial opening 14 through which the shaft 11 extends, as shown in Fig. 2. The opening 14 is preferably made slightly larger than the shaft 11 so that the roller 12 is loosely mounted thereon. A pair of radially extending flanges 15 project outwardly from the hub 13 and are formed with ridges 16 arranged to support the marginal edges of a film strip 17, as clearly shown in Fig. 1. The strip 17 is wrapped part way around the roller 12, as shown in Fig. 2, and is propelled by the latter when driven by the shaft 11, in a manner to be presently described.

The roller 12 is preferably frictionally driven by the shaft 11 so that it may be rotated as a unit therewith to propel the film strip 17 through the machine. However, should the film tension exceed a predetermined value, the load on the roller 12 will be such as to cause the latter to slip relative to the shaft to prevent breakage of the film strip, the disadvantages of which are well known to those in the art. To secure this result, the present invention provides a friction drive connection which comprises small brake shoes which are mounted in the roller 12 and bear on the shaft 11 to frictionally connect the latter in driving engagement with the roller 12. These brake shoes are held against the shaft by a spring which urges or presses the shoes radially and into friction engagement with the shaft, as is clearly apparent from inspection of Fig. 2 of the drawing. These shoes thus provide a friction clutch which operatively connects the drive shaft 11 in driving engagement with the roller 12 so that the latter may continuously propel the film strip through the machine. The shaft 11 is connected to a suitable source of power, not shown.

In the present embodiment of the invention, the hub 13 of the roller 12 is formed with a pair of diametrically arranged radial openings 20 in which a pair of brake shoes 21, of any suitable material, are slidably arranged. A U-shaped spring 22 extends part way around the hub 13 and has the ends thereof secured to steel pins 23 carried by each shoe 21 to yieldably urge or press the shoes inwardly or radially to bring the inner curved surfaces 24 thereof into frictional engagement with the shaft 11 to operatively connect the roller 12 thereto, as is apparent from an inspection of Fig. 2. The brake shoes 21 are thus yieldably held against the shaft 11 by the action of the spring 22.

The openings 20 in the hub 13 are preferably slightly larger than the shoes 21 so that the roller 11 is entirely free of the brake shoes, as shown in Fig. 2, except when the shaft 11 is being driven. When, however, the shaft 11 is rotated in the direction of the arrow, Fig. 2, the shaft moves slightly relative to the roller 12 to bring the faces 25 of the opposite brake shoes 21 into engagement with the sides 26 of the opening 20. Upon such engagement, the roller 12 is then driven by and is rotated as a unit with the drive shaft 11. Obviously, if the shaft 11 were rotated in the opposite direction, the opposite faces 27 of the shoes 21 would then engage the other sides 28 of the opening 20 to connect the roller in driving engagement with the shaft 11. If, for any reason, the load on the roller 12 increases beyond a predetermined value, the surfaces 24 of the brake shoes 21 will slip on the shaft 11 to retard or stop the rotation of the roller and thus limit the propulsive effort applied to the film, the advantages of which are obvious.

It is thus apparent from the above description that the present invention provides a friction clutch which operatively connects the film propelling roller to the drive shaft, and which also allows the roller to slip on the shaft when the tension of the film strip reaches a predetermined value.

While one embodiment of the invention has been disclosed, it is to be understood that the inventive idea may be carried out in a number of ways. This application is therefore not to be limited to the precise details described, but is intended to cover all variations and modifications thereof which fall within the spirit of the invention or the scope of the appended claims.

We claim:

1. A friction clutch comprising a driven shaft, a roller loosely mounted on said shaft and formed with a pair of diametrically arranged radial openings, a clutch member slidably mounted in each of said openings and radially movable therein to engage said shaft to operatively connect the latter to said roller, and a U-shaped spring having the ends thereof secured to said diametrically arranged clutch members to yieldably press said clutch members radially to frictionally engage said shaft.

2. A friction clutch comprising a driven shaft, a roller loosely mounted on said shaft and formed with diametrically arranged radial openings, a pair of friction members positioned in said openings and frictionally engaging said shaft to rotate therewith, said members being slightly smaller than said openings so as to be free to move radially therein but adapted to engage sides of said openings to provide the sole driving connection between said members and said roller, and a spring independent of said roller and connecting said members to yieldably urge the latter inwardly into frictional engagement with said shaft.

EINAR W. JENSEN.
CHARLES E. IVES.